Figure 1:
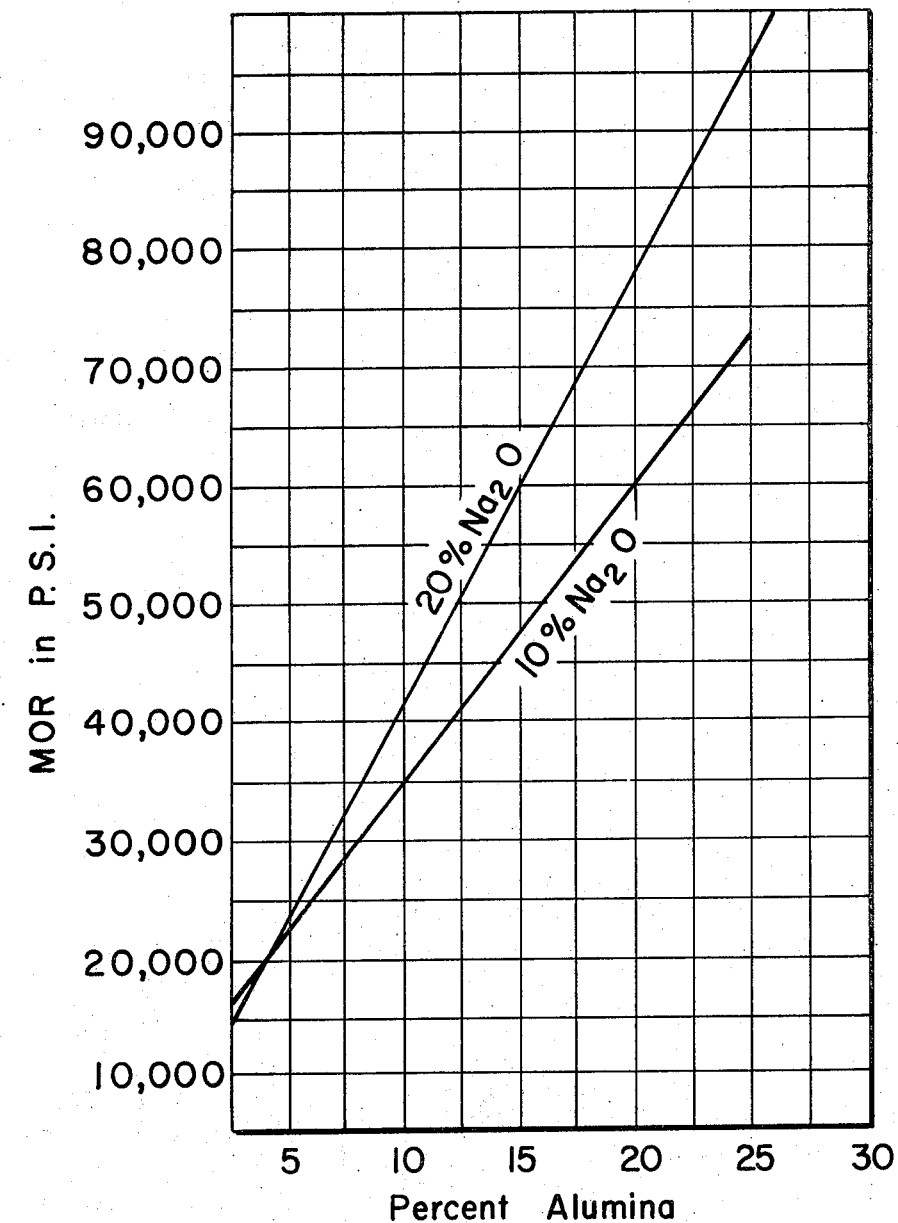

United States Patent [19]
Mochel

[11] 3,790,430
[45] Feb. 5, 1974

[54] ALKALI ALUMINOSILICATE GLASS ARTICLE HAVING AN ION-EXCHANGED SURFACE LAYER

[75] Inventor: Ellen L. Mochel, Ojai, Calif.

[73] Assignee: Corning Glass Works, Corning, N.Y.

[22] Filed: Aug. 21, 1968

[21] Appl. No.: 754,311

Related U.S. Application Data

[63] Continuation-in-part of Ser. No. 555,617, June 6, 1966, abandoned, which is a continuation-in-part of Ser. No. 181,887, March 23, 1962, abandoned.

[52] U.S. Cl............ 161/1, 65/30, 106/39.6, 106/52, 161/164, 161/166
[51] Int. Cl............ C03c 21/00
[58] Field of Search.. 65/114, 115, 116, 30; 106/48, 106/52, 39.6; 161/1, 164, 166

[56] References Cited
UNITED STATES PATENTS

| | | | |
|---|---|---|---|
| 2,779,136 | 1/1957 | Hood et al. | 65/30 |
| 3,218,220 | 11/1965 | Weber | 65/30 X |

FOREIGN PATENTS OR APPLICATIONS

835,820   5/1960   Great Britain

OTHER PUBLICATIONS

Kistler, S. S., "Stresses in Glass Produced by Nonuniform Exchange of Monovalent Ions", J. of Am. Ceram. Soc., Vol. 45, No. 2, pp. 59–68, February, 1962

Primary Examiner—S. Leon Bashore
Assistant Examiner—Richard V. Fisher
Attorney, Agent, or Firm—Clarence R. Patty, Jr.; Clinton S. Janes, Jr.

[57] ABSTRACT

This invention relates to the strengthening of glass articles through an ion exchange process wherein alkali metal ions in a surface of a glass article are replaced by larger monovalent metal ions. In carrying out the process, a surface of the glass article is contacted with a source of the larger monovalent ions at an elevated temperature below the strain point of the glass for a sufficient length of time to cause the replacement of small alkali metal ions in the glass surface with the larger monovalent metal ions to a depth of at least five microns, thereby inducing a surface compression layer of this depth on the article. This invention is specifically directed to alkali aluminosilicate glasses.

4 Claims, 2 Drawing Figures

INVENTOR.
Ellen L. Mochel

ALKALI ALUMINOSILICATE GLASS ARTICLE HAVING AN ION-EXCHANGED SURFACE LAYER

This application is a continuation-in-part of my pending application, Ser. No. 555,617, filed June 6, 1966, now abandoned, which was a continuation of my application, Ser. No. 181,887, filed Mar. 23, 1962 and now abandoned.

As used in this application, the term "strength" refers to the tensile strength of a material or article determined as modulus of rupture (M.O.R.). This is the transverse strength of a test piece, usually a rod or bar, of known cross section, and is ascertained in a conventional manner. Initially, a breaking load is ascertained by supporting the test piece across two definitely spaced knife edges, mounting a second pair of knife edges on the test piece in uniformly spaced relation between the first two knife edges, and loading the second pair until breakage occurs. The maximum tensile stress, in pounds per square inch, produced at the lower surface of the test piece is then computed from the load, the size and shape of the sample and the test geometry and is reported as M.O.R.

The term "abraded strength" refers to the tensile strength, ascertained as described above, of a body having a multiplicity of abrasions, that is visible scratches or defects, deliberately produced on its surface. The nature and degree of abrasions produced on a glass surface in service will vary with the service conditions. Accordingly, standard abrasion tests have been devised to provide a valid basis for comparison as well as to simulate known types of service conditions.

For present purposes, two types of abrasion have been employed. In one type, a test piece, e.g., a 4 inch by about ¼ inch diameter glass cane, is mechanically mounted and rapidly rotated for about 30 seconds in contact with 150 grit silicon carbide paper under a small constant pressure to maintain uniform contact. A second type is referred to as tumble abrasion. In this case, ten similar size glass rods are mixed with 200 cc. of 30 grit silicon carbide particles, and subjected to a tumbling motion for 15 minutes in a Number 0 ball mill jar rotating at 90 to 100 rpm. Surface flaws resulting from the first type of abrasion simulate flaws encountered in service as a result of rubbing against hard materials, for example glass articles rubbing against each other. Flaws produced in the latter type simulate those resulting from a combination of such rubbing abrasion and actual impact.

The strength of glass with an undamaged fresh surface is very high, as shown by measured strengths of several hundred thousand psi on freshly drawn glass fibers and rods. In actual practice, however, the strength of ordinary commercial glassware varies from 5,000 to 25,000 psi depending on the type of glass, the method of production, and the nature of subsequent handling.

It is well known that the strength of a glass article can be increased by producing a stress of substantially uniform compression in a surface layer on the glass surface. Among the known methods of producing such a surface compression layer are physical application of a casing, thermal tempering and ion exchange.

The conventional method of "casing" glass comprises covering an initial gather of one type of glass with a gather of a second glass having a lower thermal expansion coefficient than the first and then shaping the composite gather of glass as by blowing. As the composite glass article is cooled, the inner glass having the higher thermal expansion coefficient tends to contract more than the surface glass thereby producing a permanent compressional stress in the outside glass layer. Use of this method has been extremely limited because of the difficulties in producing a uniformly cased glass article.

In thermal tempering, a glass article is heated close to the glass softening temperature. The article is then rapidly chilled below the glass strain point to develop compressional stress in a surface layer. The article is usually heated and chilled in air, although suitable salt baths are also employed on occasion for either step. The effective time for either heating or cooling does not normally exceed a minute or two, and is a matter of several seconds where a salt bath is employed. Thermal tempering is the conventional commercial method of strengthening glass articles with the usual strength of a tempered glass article being about 2 ½ to 3 ½ times the strength of a corresponding annealed glass article. It is desirable to provide considerably higher strengths in many glass articles. Also, the thermal tempering process is usually not feasible with thin glass articles, with articles having widely varying thickness, and with articles having internal surfaces which cannot readily be chilled, for example, narrow necked bottles.

The ion exchange method of producing a compression layer involves exposing a glass surface to a source of ions which, at an elevated temperature, exchange with an ion present in the glass. This produces a surface layer of glass having a composition differing from that of the parent glass, and, in essence, is a thermochemical method of casing glass.

U.S. Pat. Nos. 2,075,446 and 2,779,136 describe a high temperature ion exchange process wherein alkali ions within a glass are replaced (by copper or silver and lithium ions respectively) by immersion of the glass in a high temperature molten salt bath containing the replacement ions. In accordance with the patent teachings, the ion exchange is effected above the strain point of the glass to produce a relatively low expansion coefficient glass casing and avoid surface cracking or crazing otherwise encountered and detrimental to strengthening. Furthermore, optimum strengthening is comparable to thermal tempering values, except where formation of a crystal phase occurs in the glass surface. Douglas and Isard, in "Transactions of the Society of Glass Technology", Vol. 33, p. 289–335 (1949), describe a process of soda extraction catalyzed by sulfur oxides which may involve ion exchange in the presence of hydrogen ions, the exchange being between sodium ions from the glass and hydrogen ions from the atmosphere. As indicated by U.S. Pat. No. 2,075,446, such ion exchange is also a preliminary step in glass staining, wherein silver or copper ions are exchanged for sodium ions and precipitate in colloidal form to produce an amber or ruby color.

More recently, a theory of glass strengthening by low temperature ion exchange has been proposed. In accordance with this theory, a layer of compressive stress might be induced by replacing smaller diameter alkali ions in a surface layer of a glass article with larger diameter alkali ions from an external source. The layer of compressive stress would be induced in the glass surface by the glass volume tending to increase as the ion replacement is effected in the glass structure, and by this tendency being inhibited due to the temperature being too low to permit normal viscous flow of the glass at a rate sufficient to release the stresses introduced. In support of the theory, it has been reported that strength increases were achieved by exchanging potassium ions for sodium ions in a soda lime glass at a temperature below the glass strain point. This temperature was considered necessary to avoid stress relaxation.

A low temperature method of ion exchange strengthening would be particularly desirable because it would minimize ware distortion. Strengthtening without crystal development would also be desirable in order to provide a completely transparent product. This is vital in ophthalmic lenses and other applicatons in the field of optics where light scattering cannot be tolerated. It is desirable in other types of glassware as well, such as table glassware where a basic advantage of glass is its clarity.

Rather high mechanical strengths are reported to be obtainable with the potassium ion method of strengthening commercially available lime glasses. Further study reveals that, while high strengths may be obtained under optimum circumstances, they are largely or completely lost when such a strengthened glass article is subjected to abrasion. As a practical matter, most glass articles are subjected to some degree of abrasion in service. Accordingly, high strength is usually of little interest unless it is abraded strength, that is the strength of a glass article after the article has been subjected to either service or experimental test abrasion.

It has now been discovered that alkali aluminosilicate glasses, i.e., glasses containing at least 5 percent alumina, are affected in a surprising, and as yet unexplained, manner when exposed to certain types of ion exchange treatment. This phenomenal effect of ion exchange on alkali aluminosilicate glasses manifests itself in the nature of the ion exchange layer formed, especially the nature of the strengthening that results from forming such compressively stressed layer on a glass article. In accordance with present discoveries, the abraded strength of a glass article can be increased to values ranging from 20,000 psi to over 100,000 psi within 1 to 16 hours depending on the glass, the type of ion exchange process and temperature of treatment. This is in contrast to prior experience with commercial glasses containing up to two percent or so of alumina. With such glasses, only nominal increases in abraded strength can normally be obtained by corresponding treatment.

The increased abraded strength of treated alkali aluminosilicate glasses is not uniquely dependent on a particular ion exchange process. It occurs in the high temperature process where hydrogen ions replace sodium ions, and also in the low temperature process where large monovalent ions replace smaller alkali metal ions in the glass, e.g., potassium ions replace sodium ions. It is apparent that the presence of alumina, in relatively large amounts, exerts some unusual influence.

The nature of this influence is especially puzzling. It does not appear to be explainable by the depth of penetration or amount of ion exchange effected despite the fact that ion exchange to a depth of several microns seems to be essential to obtain increased abraded strength. Thus, a substantial increase in abraded strength of an aluminosilicate glass may be observed by effecting a given amount of ion exchange to a given depth (as shown by weight increase and chemical analyses), whereas an equal or even greater degree of exchange in a soda lime glass does not produce a corresponding increase in abraded strength. It appears that some unexplained effect, over and beyond depth and degree of ion exchange, is involved in this puzzling phenomenon. Further, the effect does not appear to directly involve or alter the alumina, as in the case where low expansion crystals containing alumina are precipitated.

Broadly, my invention is an improved method of thermochemically exchanging an alkali ion within a surface layer of glass with an ion from an external source, wherein the glass ion-external source exchangeable ion pair in alkali metal ion-larger monovalent ion pairs, the improvement comprising forming an article from an alkali aluminosilicate glass composed essentially of an alkali metal oxide, at least 5 percent $Al_2O_3$, and the balance silica and optionally containing compatible glass ingredients in amount not exceeding about 20 percent. The invention is also an improved method of producing a strengthened article by such thermochemical ion exchange, particularly a strengthened article having a compressively stressed surface layer resulting from such ion exchange.

Available evidence indicates that the unabraded strength of a glass surface can be increased several fold by ion replacement occurring at or very near the glass surface, that is within the initial micron or so of the surface, but that such shallow surface srengthening is largely or completely lost when the surface is abraded. Logically, this might be attributed to the surface abrasion cutting or extending through the strengthened layer, thereby rendering it ineffective. However, since increased abraded strengths may be attained in alkali aluminosilicate glasses with depths and total amounts of ion replacement that are ineffective in soda lime glasses, enhanced depth and degree of ion replacement do not appear to completely account for the unusual strengthening potential in alkali aluminosilicate glasses.

On the other hand, a substantial depth of ion replacement, or thickness of compressive layer produced, is required even in alkali aluminosilicate glasses to impart abraded strength. Thus chemical analyses on successive thin layers chemically stripped from strengthened glasses indicate a depth exceeding 5 microns as generally necessary to provide increased grit abraded strength. Moreover, abraded strength generally increases to a maximum value with increase in time or temperature of treatment. This suggests a complex relationship involving ion exchanged layer thickness, depth of weakening flaws in a glass surface, strength and other unidentified factors as well.

The improved thermochemical ion exchange is effected by bringing a preformed alkali aluminosilicate glass article into intimate contact with a material containing thermally exchangeable ions at an elevated temperature. During the ensuing thermally induced ion exchange, ions from the glass are replaced by a corresponding number of ions from the contacting material to maintain an electrical balance in the glass. The depth of this ion exchange or replacement increases both with time and temperature, thus increasing the depth of the glass surface layer formed by this ion exchange or replacement providing the temperature is not so high as to permit stress relaxation in the case of low temperature ion exchange.

Prior to the thermochenical ion exchange step of the present method, an alkali aluminosilicate glass melt is provided in conventional manner and a glass article is molded therefrom to a desired shape or configuration by a conventional glass-forming process such as blowing, pressing, or drawing. The shaped glass article is then brought to a predetermined ion exchange temperature either by interruption of its cooling subsequent to forming, or by reheating.

The ion exchange temperature will depend on the type of exchange involved. Thus the replacement of sodium by hydrogen ions requires a temperature above the glass strain point. The exchange of an alkali ion with a larger ion is conducted at a lower temperature such that substantial stress relaxation does not occur. In general, this indicates a temperature below the strain point of the glass. On the other hand, a temperature of at least 200°C. is normally required to avoid excessive time, and higher temperatures approaching the glass strain point are normally preferred.

In the low temperature type of ion exchange, the rate and depth of exchange are greater in the smaller size pairs. Accordingly, the most rapid exchange can be expected in the case of lithium-sodium exchange. It also follows that, for a given ion in the glass, most rapid exchange is obtained with the next larger alkali ion in the periodic table, e.g., lithium-sodium, sodium-potassium, potassium-rubidium and rubidium-cesium. Monovalent ions other than the alkali ions also provide effective ion exchange pairs, e.g., lithium-copper and sodium-silver.

The ion exchange process under consideration is a diffusion process wherein the amount of ion exchange increases linearly with the square root of treating time, other factors being equal. Since diffusion rate increases with temperature, it is apparent that the treating temperature should ordinarily be as high as feasible without occurrence of excessive stress relaxation, article deformation or other adverse thermal effect.

As a general rule, the low temperature ion exchange process can be conducted safely at temperatures below the glass strain point, temperatures in the range 350°–500°C. being commonly employed. At such temperatures, strengthening of lithium aluminosilicate glasses is normally attained within a period of about one to four hours, and of sodium aluminosilicate glasses in 4 to 16 hours. However, adequate strengthening for some purposes can be obtained in lesser times. In any event, the maximum temperature-time cycle or schedule of treatment must not be such that substantial rearrangement of the glass structure and consequent stress relaxation can occur.

By way of illustrating temperature effect, approximately equal degrees of strengthening may be obtained in a glass of sufficiently high strain point under otherwise constant conditions with the following ion exchange schedules: (1) 300°C. for 16 hours, (2) 350°C. for 8 hours, (3) 400°C. for 4 hours, (4) 500°C. for about one hour, and (5) 550°C. for about 15 minutes. The treating schedule will depend primarily on the required depth of ion exchange for the strengthening effect desired, that is the depth of the compression layer produced thereby, and secondarily on considerations of commercial practicality and convenience, an optimum schedule for any given glass or glass article being readily ascertainable by routine experimentation.

The material brought into contact with the glass surface to effect ion exchange may be any ionizable material containing exchangeable ions and may be in vapor, liquid, or solid form. The essential condition appears to be provision of intimate contact of exchangeable ions with the alkali-containing glass surface. Accordingly, the process is termed thermochemical ion exchange, that is exchange of ions between two chemically combined materials induced by the influence of temperature.

The low temperature ion exchange treatment may be by immersion of the preformed glass article in a molten salt bath, e.g., a soda glass in a potassium nitrate bath. Any alkali salt may be employed that provides the desired ion, does not readily decompose at treating temperature and does not adversely affect the glass surface by chemical attack or otherwise. Mixed salts may be employed, although any substantial amount of the alkali ion being removed from the glass, or a smaller ion, should normally be avoided. It is recognized that molten alkali metal baths have been employed for thermal tempering. However, this is a physical treatment involving heat extraction, is of very short duration and is ineffective below the strain point of the glass.

The desired ion exchange may also be effected from a paste material applied over the glass surface prior to heat treatment. The paste may be produced by mixing an alkali metal salt with a small amount of known inert binder and/or filler materials, such as ochre, and a vehicle.

The invention is described with reference to the low temperature ion exchange process where an alkali ion in a glass is replaced by a larger monovalent ion from an external contacting material. In this type of exchange, the rate at which ion exchange occurs generally decreases with increase in ion size. Accordingly, where time is of primary significance, it is preferable to employ lithium aluminosilicate glasses wherein lithium ions in the glass are exchanged with sodium ions. However, technical and economic problems associated with melting and forming of such lithia glasses will frequently offset the factor of ion exchange time. Consequently, for many purposes it will be preferable to employ sodium aluminosilicate glasses and effect a sodium-potassium ion exchange. In general, there is little commercial interest in larger monovalent ion exchange pairs. Soda or lithia glasses may be employed in conjunction with silver or copper ion exchange materials where the special effects of such ions in glass are either desired or tolerable.

The embodiment of the invention involving lithium aluminosilicate glasses is fully described in an application filed Mar. 23, 1962, Ser. No. 181,886, in the name of H. M. Garfinkel. The present description is more specifically directed to sodium aluminosilicate glasses adapted to sodium-potassium ion exchange. It will be understood, however, that the general principles and procedures apply to all ion exchange pairs in this type of process.

Sodium aluminosilicate glasses suitable for purposes of improved ion exchange between sodium and potassium ions, and consequent imparting of increased abraded strength consist essentially of at least 5 percent $Na_2O$, at least 5 percent $Al_2O_3$, the balance being $SiO_2$. Optionally up to about 15 percent of other compatible glass-forming ingredients may be present. Glasses in which either the $Na_2O$ or $Al_2O_3$ content is above about 25 percent are generally too low in chemical durability and/or too difficult to melt to be of practical interest. As either the $Na_2O$ or $Al_2O_3$ content is decreased the degree of strengthening within a given time diminishes.

Accordingly, their combined content should ordinarily not be less than about 15 percent if substantial abraded strength is to be imparted. This will be better understood from reference to the accompanying drawings wherein FIGS. 1 and 2 are graphical illustrations of the effect on abraded strength resulting from glass composition change.

Figure 2:
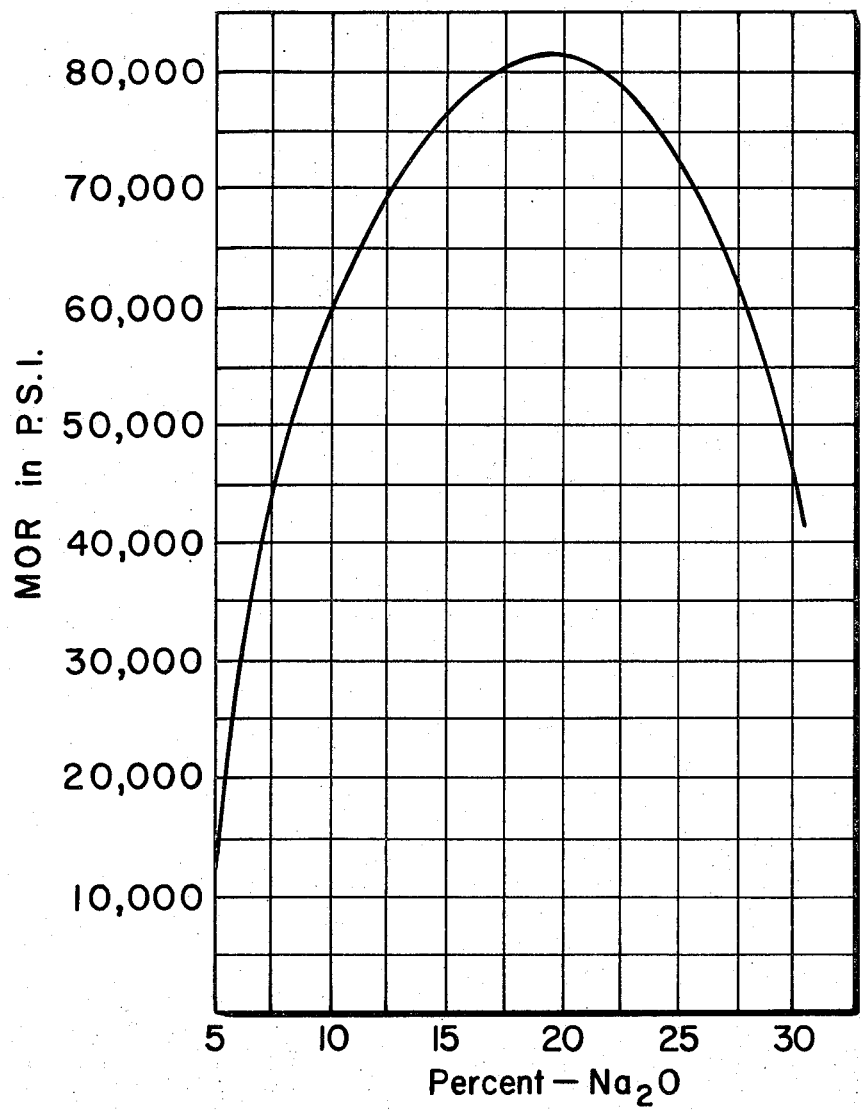

FIG. 1 is a graphical illustration in which abraded strength (150 grit abrasion) is plotted as M.O.R. in psi along the vertical axis and percent by weight of $Al_2O_3$ in a glass is plotted along the horizontal axis. The curves show that abraded strength of the glass surface progressively increases at constant $Na_2O$ content as $Al_2O_3$ is substituted for $SiO_2$ in simple $Na_2O$-$Al_2O_3$-$SiO_2$ glasses having $Na_2O$ contents of 20 percent and 10 percent. While the actual strength values would vary, the same general trend would be found for similar comparisons at other soda contents.

The data, from which the curves of FIG. 1 were plotted, were secured by melting two series of glasses, one series composed of 20 percent $Na_2O$, 5–30% $Al_2O_3$, and 75–50% $SiO_2$, and the other 10% $Na_2O$, 5–30% $Al_2O_3$ and 85–60% $SiO_2$. In formulating these series of glasses, $Al_2O_3$ was progressively increased at the expense of $SiO_2$. Each melt of glass was drawn into quarter inch glass cane and the cane cut into four inch lengths. For each glass, a set of five cane samples was immersed in a potassium nitrate bath maintained at the temperature of about 380°C., the immersion time being for a period of 16 hours. The cane samples were then removed, cooled and adherent salt washed from their surface. Samples were abraded with 150 grit silicon carbide paper and strength measurements made on each cane as previously described. The calculated M.O.R. values thus obtained for each set of cane were averaged to obtain the values plotted.

A corresponding set of glass compositions was formulated and melted wherein the $Al_2O_3$ was held constant at 16 percent and $Na_2O$ progressively increased at the expense of the third constituent $SiO_2$, the $Na_2O$ content varying from 5 to 30% and the $SiO_2$ content varying from 79 to 54 percent in the series of glass melts. Cane samples were drawn, treated and tested in essentially identical manner to that described for the constant $Na_2O$ content glasses. The average M.O.R. data thus obtained for each glass melt was plotted and provides the basis for the curve shown in FIG. 2.

Oxides other than the three prescribed as essential appear to have little beneficial effect on the strengthening of a glass. In small amounts, however, they may be desirable for such secondary purposes as improving melting characteristics of a glass and modifying glass properites, e.g., expansion coefficient and refractive index. These optical additives include divalent oxides, $K_2O$, $B_2O_3$, $P_2O_5$, $TiO_2$, and F. In general, such additives may be introduced into glasses of high strengthening potential in amounts up to about 10 percent individually and about 15 percent collectively. Such maximum amounts may reduce maximum M.O.R. after ion exchange by as much as a half. $Li_2O$ should normally not exceed about 1 percent. The usual additives, such as colorants and fining agents, may be included in accordance with glass making practice.

Tables I and II illustrate a variety of sodium aluminosilicate glasses suitable for purposes of the invention. Average M.O.R. measurements made on sets of cane of each composition after various treatments are also reported. Glasses 1, 2 and 9 were treated in a $KNO_3$ salt bath for 16 hours at 350°C.; glasses 3–8 for 16 hours at 380°C.; and glasses 10–12 at 450°C. for 4 hours. Measurements were made after 150 grit and/or tumble abrasion as indicated. For comparison, a set of annealed untreated canes of certain glasses were also 150 grit abraded and M.O.R. measurements made. In the tables the strengths after treatment are indicated as "150 grit" or "tumble", depending on the type of abrasion. The measurements on untreated, annealed, abraded cane are indicated as "annealed".

TABLE I

|  | 1 | 2 | 3 | 4 | 5 | 6 |
|---|---|---|---|---|---|---|
| $SiO_2$ | 66 | 66 | 56½ | 56½ | 56½ | 62½ |
| $Al_2O_3$ | 18 | 18 | 18 | 18 | 18 | 18 |
| $Na_2O$ | 16 | 14 | 14 | 14 | 14 | 15 |
| ZnO |  |  |  | 5 |  |  |
| BaO |  |  |  |  | 5 |  |
| PbO |  |  | 5 |  |  |  |
| $B_2O_3$ |  | 2 | 2 | 2 | 2 |  |
| $TiO_2$ |  |  | 4½ | 4½ | 4½ | 4½ |
| M.O.R. × $10^{-3}$ psi |  |  |  |  |  |  |
| 150 grit | 54 | 58 | 77 | 67 | 54 | 52 |
| annealed |  |  | 10 | 8 | 11 |  |

TABLE II

|  | 7 | 8 | 9 | 10 | 11 | 12 |
|---|---|---|---|---|---|---|
| $SiO_2$ | 54½ | 58½ | 52 | 57½ | 57 | 58½ |
| $Al_2O_3$ | 19 | 18 | 25 | 22 | 22 | 22 |
| $Na_2O$ | 16 | 15 | 15 | 15 | 14 | 15 |
| $Li_2O$ |  |  |  |  | 0.5 |  |
| CaO | 2 |  | 1 |  |  |  |
| $K_2O$ | 2 |  |  |  |  |  |
| $ZrO_2$ |  |  |  |  |  | 2 |
| $B_2O_3$ | 2 | 4 | 4 |  |  |  |
| $TiO_2$ | 4½ | 4½ | 4 | 4½ | 4½ | 4½ |
| F |  |  |  | 1 | 1 | 1 |
| M.O.R. × $10^{-3}$ psi |  |  |  |  |  |  |
| 150 grit | 70 | 40 | 86 | 73 | 57 | 71 |
| annealed | 9 |  |  | 10 |  |  |

By way of illustrating comparable strengthening effects customarily obtained by treatment of conventional commercial soda lime glasses containing 1–2% $Al_2O_3$, corresponding strength measurements were made on cane drawn from the following glasses:

TABLE III

|  | 1 | 2 | 3 |
|---|---|---|---|
| $SiO_2$ | 69.9 | 73.6 | 70 |
| $Al_2O_3$ | 2.0 | 1.1 | 2 |
| $Na_2O$ | 12.1 | 17.0 | 14 |
| $K_2O$ | 6.0 | 0.2 |  |
| CaO | 4.1 | 4.8 | 14 |
| MgO | 2.9 | 3.3 |  |
| $B_2O_3$ | 3.0 |  |  |

Glass No. 1 is a high chemical durability, general purpose lime glass commercially available in cane form. Canes were treated in a $KNO_3$ salt bath for 16 hours at 350°C. The average M.O.R. on unabraded cane was 56,000 psi; on 150 grit abraded cane, 18,000 psi; and on tumble abraded, 14,000 psi. By comparison, the corresponding average M.O.R.'s on untreated annealed cane were respectively 21,000, 9,000 and 8,000.

Cane drawn from glasses 2 and 3, respectively a commercial bulb glass and a commercial window glass, were treated in similar manner at 400°C. for 16 hours and strength tested after no abrasion, 150 grit abrasion and tumble abrasion. The average M.O.R.'s were 82,000, 37,000 and 11,000 psi, and 74,000, 12,000 and no measurement, respectively.

By way of illustrating commercial utility, safety lenses, having the following composition 55% $SiO_2$, 18% $Al_2O_3$, 16½% $Na_2O$, 2% CaO, 2% $K_2O$, 2% $B_2O_3$, and 4½% $TiO_2$, were strengthened by immersion in a $KNO_3$ molten salt bath for 16 hours at 350°C. The strengthened lenses were then impact tested in accordance with the prescribed procedure. The average height at which breakage occurred was about 225 inches.

In general, the effect of alumina in lithium silicate glasses parallels that heretofore described for soda glasses. This may be seen from the following Table showing a series of $Li_2O$-$Al_2O_3$-$SiO_2$ glass compositions in mol percent wherein $Li_2O$ is held constant at 18 mol percent (about 8–9 percent by weight) and $Al_2O_3$ is substituted for $SiO_2$. Also shown is the average M.O.R. calculated from breaking load measurements made on cane strengthened by treatment in a sodium nitrate bath at 400°C. for four hours and tumble abraded.

TABLE IV

|    | $SiO_2$ | $Al_2O_3$ | $Li_2O$ | M.O.R. × $10^{-3}$ psi |
|----|---------|-----------|---------|------------------------|
| 1. | 74      | 8         | 18      | 35                     |
| 2. | 72      | 10        | 18      | 46                     |
| 3. | 68      | 14        | 18      | 60                     |
| 4. | 64      | 18        | 18      | 64                     |
| 5. | 60      | 22        | 18      | 106                    |
| 6. | 56      | 26        | 18      | 98                     |

While a substantial degree of strengthening can be obtained with lithia contents as low as 1 to 2 percent, it is generally preferable that the glass contain somewhat larger amounts of lithia ranging up to about 20 percent by weight (about 40 mol percent). Relatively large amounts of lithia render the glass very soft and difficult to work while apparently providing somewhat less than optimum strengthening characteristics as well. The content of alumina should be as high as feasible and preferably at least 10 percent by weight (about 5 mol percent).

Optionally, other silicate glass components, e.g., $K_2O$, $Na_2O$, divalent oxides including PbO, $TiO_2$, $B_2O_3$, and $P_2O_5$, as well as fluorine, may be present in amounts up to 15 mol percent depending on the particular oxide, with the collective content not exceeding about 20 mol percent. In general, except for $TiO_2$ and possibly PbO, the addition of these optional ingredients to a glass appears to diminish the strengthening potential of the glass. They may, however, be desirable as an aid in melting, particularly where the lithia content is low, as an aid in reducing devitrification tendencies, and as an aid in improving durability and modifying such properties as refractive index.

Glasses especially suitable for strengthening may be economically produced from readily available lithia raw materials such as petalite and spodumene. The following batch formulation and calculated oxide content of the resultant melts illustrate two such glasses:

| Batch Materials | A     | B    |
|-----------------|-------|------|
| Petalite        | 497.3 |      |
| Spodumene       |       | 712  |
| Feldspar        |       | 288  |
| Boric Acid      | 86.7  |      |
| Magnesia        | 15.9  |      |
| $As_2O_5$       | 3.5   | 7.7  |
| Oxides          | A     | B    |
| $SiO_2$         | 69.1  | 66.1 |
| $Al_2O_3$       | 14.8  | 24.9 |
| $Li_2O$         | 4.1   | 5.7  |
| $B_2O_3$        | 8.7   |      |
| MgO             | 2.8   |      |
| $K_2O$          |       | 1.9  |
| $Na_2O$         |       | 0.6  |
| $As_2O_3$       | 0.5   | 0.8  |

Numerous further modifications of the invention, as hereafter defined, will become apparent from the foregoing description. In particular, while the invention is particularly applicable to homogeneous, transparent glass articles, it may also be employed to strengthen or otherwise impart desired properties to other types of ceramic articles having a surface layer composed in part at least of an alkali aluminosilicate glass, as described earlier. Such embodiments are intended to be encompassed within the scope of the appended claims.

I claim:

1. An alkali aluminosilicate glass article having substantially increased strength after being subjected to surface abrasion, said article containing ions of an alkali metal and of a monovalent metal of larger size selected from the group consisting of the alkali metals, copper, and silver and having a surface compressive stress layer of a depth of at least 5 microns, the concentration of the ions of a monovalent metal of larger size being greater in the surface layer than in the interior portion of the article and the concentration of the smaller alkali metal ions being greater in the interior portion of said article than in the surface layer thereof, said differences in concentration creating the compressive stress in the surface layer, the interior portion of said glass article having a composition consisting essentially, by weight on the oxide basis, of about 5–25 percent alkali metal oxide, 5–25% $Al_2O_3$, and $SiO_2$, the total of alkali metal oxide, $Al_2O_3$, and $SiO_2$ constituting at least 80 percent by weight of the glass composition.

2. An alkali aluminosilicate glass article according to claim 1 wherein said smaller alkali metal ions are lithium ions and said larger monovalent metal ions are sodium ions.

3. An alkali aluminosilicate glass article according to claim 1 wherein said smaller alkali metal ions are sodium ions and said larger monovalent metal ions are potassium ions.

4. An alkali aluminosilicate glass article exhibiting a modulus of rupture of at least 30,000 psi after being subjected to surface abrasion, said article containing ions of an alkali metal and of a monovalent metal of larger size selected from the group consisting of the alkali metals, copper, and silver and having a surface compressive stress layer of a depth of at least 5 microns, the concentration of the ions of a monovalent metal of larger size being greater in the surface layer than in the interior portion of the article and the concentration of the smaller alkali metal ions being greater in the interior portion of said article than in the surface layer thereof, said differences in concentration creating the compressive stress in the surface layer, the interior portion of said glass article having a composition consisting essentially, by weight on the oxide basis, of about 5–25 percent alkali metal oxide, 10–25 percent $Al_2O_3$, and $SiO_2$, the total of alkali metal oxide, $Al_2O_3$, and $SiO_2$ constituting at least 80 percent by weight of the glass composition.

* * * * *